United States Patent
Geller et al.

(10) Patent No.: US 11,366,741 B2
(45) Date of Patent: Jun. 21, 2022

(54) DEBUGGING QUANTUM PROGRAMS

(71) Applicant: Microsoft Technology Licensing, LLC, Redmond, WA (US)

(72) Inventors: Alan Geller, Redmond, WA (US); Krysta Svore, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/215,235

(22) Filed: Dec. 10, 2018

(65) Prior Publication Data

US 2019/0179730 A1 Jun. 13, 2019

Related U.S. Application Data

(60) Provisional application No. 62/596,719, filed on Dec. 8, 2017.

(51) Int. Cl.
   G06F 11/36 (2006.01)
   G06N 10/00 (2022.01)

(52) U.S. Cl.
   CPC ...... G06F 11/3664 (2013.01); G06F 11/3624 (2013.01); G06F 11/3648 (2013.01); G06N 10/00 (2019.01); G06F 11/3688 (2013.01)

(58) Field of Classification Search
   None
   See application file for complete search history.

(56) References Cited

U.S. PATENT DOCUMENTS

| | | | |
|---|---|---|---|
| 2018/0218281 A1* | 8/2018 | Reinhardt | G06N 10/00 |
| 2019/0019102 A1* | 1/2019 | Babbush | G06F 17/10 |
| 2019/0102690 A1* | 4/2019 | Bishop | G06N 10/00 |
| 2019/0164079 A1* | 5/2019 | Gambetta | G06N 5/003 |

OTHER PUBLICATIONS

Debajyoti Bera, Detection and Diagnosis of Single Faults in Quantum Circuits, 14 pages (Year: 2018).*
Khammassi et al., QXa High-Performance Quantum Computer Simulation Platform, 6 pages (Year: 2017).*
Huang et al, Statistical Assertions for Validating Patterns and Finding Bugs in Quantum Programs, 13 pages (Year: 2019).*
Svore et al., The Quantum Future of Computation, 10 pages (Year: 2016).*
6245210, Provisional application of US 2018/0218281 (Year: 2017).*
International Search Report and Written Opinion dated Mar. 14, 2019, from International Patent Application No. PCT/US2018/064797, 17 pp.
Michielsen et al., "QCE: A Simulator for Quantum Computer Hardware," *Turkish Journal of Physics*, vol. 27, No. 5, pp. 343-370 (Sep. 2003).

* cited by examiner

*Primary Examiner* — Philip Wang
(74) *Attorney, Agent, or Firm* — Klarquist Sparkman, LLP

(57) ABSTRACT

This disclosure concerns tools and techniques for debugging a quantum program (e.g., a program used to configure and control a quantum computing device). Because the state space of a quantum program is so much larger and less structured than the state space for a classical program, new techniques are required to help the program developer and coder determine whether or not their program is working correctly and to identify errors if not. The disclosed technology provides tools and techniques for debugging quantum programs using a classical computer.

11 Claims, 12 Drawing Sheets

600

| Name | Value |
|---|---|
| ▷ ● this | (Operation) |
| ▷ ● _in | {0} |
| ▷ ● register1 | Count = 2 |
| ▷ ● q | Count = 2 |
| ▲ ● register2 | Count = 4 |
|   ▲ ● [0] | {q:3} |
|     🔧 Id | 3 |
|     🔧 Probability | 0 |
|   ▲ ● [1] | {q:2} |
|     🔧 Id | 2 |
|     🔧 Probability | 0 |
|   ▲ ● [2] | {q:4} |
|     🔧 Id | 4 |
|     🔧 Probability | 0 |
|   ▲ ● [3] | {q:5} |
|     🔧 Id | 5 |
|     🔧 Probability | 0 |

610 — register2 block
612 — [0]
614 — [1]
616 — [2]
618 — [3]
620 — Id: 2
622 — Probability: 0

```
Q#                                                              Copy operation AssertProb (bases : Pauli[], qubits : Qubit[], result : Result, prob
: Double, msg : String, tol : Double) : Unit
```

```
Q#                                                      Copy
using (register = Qubit()) {
    P(register);
    Adjoint Q(register);

AssertQubit(Zero, register);
}
```

```
Q#                                                      Copy
operation AssertQubit (expected : Result, q : Qubit) : Unit
```

DEBUGGING QUANTUM PROGRAMS

CROSS REFERENCE TO RELATED APPLICATIONS

This application claims the benefit of U.S. Provisional Application No. 62/596,719, entitled "DEBUGGING SIMULATED QUANTUM PROGRAMS" and filed on Dec. 8, 2017, which is hereby incorporated herein by reference in its entirety.

SUMMARY

This disclosure concerns tools and techniques for debugging a quantum program (e.g., a program used to configure and control a quantum computing device). Because the state space of a quantum program is so much larger and less structured than the state space for a classical program, new techniques are required to help the program developer and coder determine whether or not their program is working correctly and to identify errors if not. Past approaches rely on the developer to look at the entire unstructured quantum state without any assistance. The disclosed technology provides tools and techniques for debugging quantum programs using a classical computer.

In one example embodiment, a quantum program written in a quantum computer language that is synthesizable into quantum-computer-executable instructions for operating a quantum computer is input (e.g., buffered into memory, loaded, or otherwise prepare for further processing); a command is received to set a breakpoint in the quantum program; execution of the quantum program is simulated, on the classical computer, as if it were being executed by the quantum computing device; the simulating is halted when the breakpoint in the quantum program is reached; a command to examine a current state of one or more qubits being simulated by the classical computer is implemented; and data describing the outcome of the command is displayed on a graphical user interface.

In another example embodiment, a quantum program written in a quantum computer language that is synthesizable into quantum-computer-executable instructions for operating a quantum computer is input (e.g., buffered into memory, loaded, or otherwise prepared for further processing); one or more statements or function invocations are included in the quantum program, where the one or more statements or function invocations comprise an assertion that asserts that a probability of the current state of the one or more qubits has an expected value; execution of the quantum program is simulated, on the classical computer, as if it were being executed by the quantum computing device; the assertion included in the quantum program is verified, on the classical computer, as being either true or not true; and data identifying whether the assertion is true or not true is displayed on a graphical user interface.

In a further example embodiment, a quantum program written in a quantum computer language that is synthesizable into quantum-computer-executable instructions for operating a quantum computer is input (e.g., buffered into memory, loaded, or otherwise prepare for further processing); one or more statements or function invocations are included in the quantum program, where the one or more statements or function invocations comprise a command to derive and display quantum states of a subset of two or more qubits being simulated; execution of the quantum program is simulated, on the classical computer, as if it were being executed by the quantum computing device; and the quantum states of the specified qubits are derived and displayed on the classical computer.

Any of the above disclosed methods can be implemented as computer-readable media storing computer-executable instructions which when executed by a classical computer processor cause the classical computer processor to perform any of the disclosed methods. Further, any of the above disclosed methods can be implemented as part of a quantum computing system. For example, any of the above disclosed methods can be implemented by a system comprising a quantum computing device, and a classical computing device in communication with the quantum computing device and configured to perform any of the disclosed methods.

The foregoing and other objects, features, and advantages of the disclosed technology will become more apparent from the following detailed description, which proceeds with reference to the accompanying figures.

BRIEF DESCRIPTION OF THE DRAWINGS

FIG. 6 is an example screen shot showing a graphic user interface that allows a developer to inspect various properties of the qubits currently be simulated.

DETAILED DESCRIPTION

I. General Considerations

Figure 1:
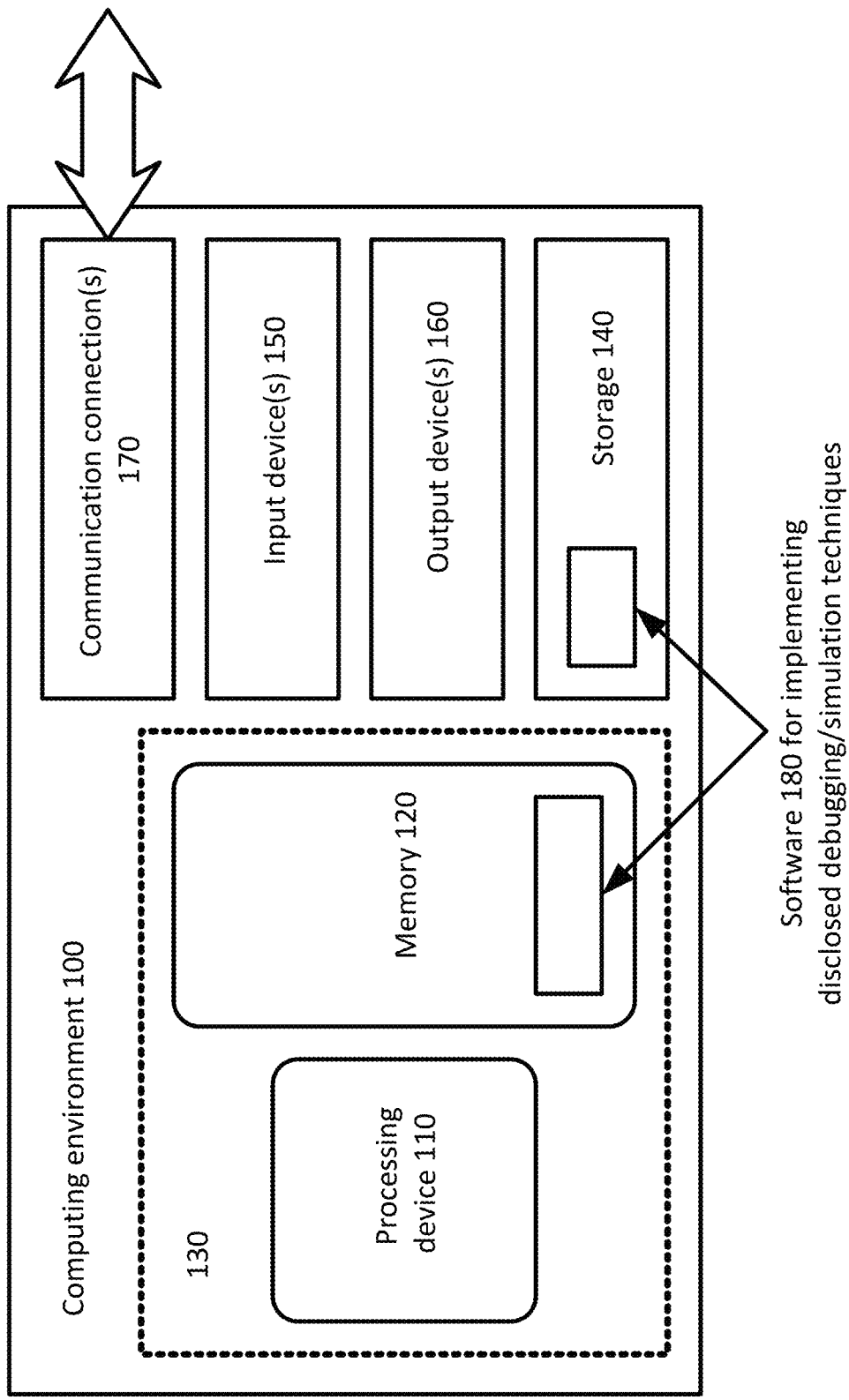
FIG. 1 illustrates a generalized example of a suitable classical computing environment in which several of the described embodiments can be implemented.

As used in this application, the singular forms "a," "an," and "the" include the plural forms unless the context clearly dictates otherwise. Additionally, the term "includes" means "comprises." Further, the term "coupled" does not exclude the presence of intermediate elements between the coupled items. Further, as used herein, the term "and/or" means any one item or combination of any items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

II. DETAILED EXAMPLES

Embodiments of the disclosed technology comprise user interface elements and actions that allow the developer of quantum program to interact with and understand the simulated quantum state in a useful way. There can also be mathematical algorithms used to detect and describe characteristics of the quantum state or how one quantum state differs from another used during the debugging process. Aspects of the disclosed technology involve allowing a developer of a quantum program (to be implemented on a quantum computing device) to interact with and visualize the current (simulated) quantum state in a wide variety of ways. While no one way may work for all debugging scenarios, embodiments of the disclosed technology offer a variety of options that can allow a developer to find way(s) that work for her problem.

The examples below describe example interactions and/or user interface experiences that disclose various actions and/or interfaces for analyzing and verifying quantum programs for implementation on a quantum computing device. Any one or more of the examples below can be implemented in a quantum program debugging tool alone or in any combination or subcombination with one another. Some of the disclosed features refer to particular implementations, but those implementations are by way of example only, as they are adaptable to other formats, programming languages, and underlying operating systems.

A. Allowing the Developer to Set a Breakpoint in their Quantum Code and Step Through their Quantum Code The user interface experience, in this example embodiment, is to allow a programmer to select a line in their quantum source file and hit a key or key combination (e.g., F9 or other function key) to set a breakpoint, or to clear an existing breakpoint. When the program is running in the debugger, if it is about to execute a line of code that has a breakpoint set, it will first pause execution and pass control to the developer, allowing them to inspect the state of the program. When they are ready, the developer can hit another key or key combination (e.g., F5 or other function key) to continue execution until the program ends or the next breakpoint is reached.

When the program is paused at a line of code (because of a breakpoint, for instance), the developer can hit a certain key or key combination (e.g., F10) to execute the current line of quantum code and then pause before the next line of quantum code.

Figure 5:
FIG. 5 is a screen shot showing an example of a breakpoint set for an example quantum program.

FIG. 5 is a screen shot 500 showing an example of a breakpoint 510 set for an example quantum program (here, a Q #program, though the program can be in any suitable quantum programming language). In the illustrated screen shot 500, the breakpoint indicator appears as a red dot in the left margin. During debugging, execution of the quantum program pauses at the breakpoint before the code on that line is executed. Further, in certain embodiments, the breakpoint indicator can change to a different indicator (e.g., a red dot with an arrow) to flag for the developer that the indicated breakpoint is currently triggered. Still further the relevant line(s) of the quantum program can be highlighted to draw the developer's attention to the breakpoint.

B. Allowing the Developer, at a Breakpoint or after a Step, to Interact with the Quantum State Embodiments of the disclosed technology allow a developer to perform numerous quantum-specific interactions or functions when the simulated execution of the quantum code is paused. In a standard program, the developer can look at the values stored in variables and look at the call chain that shows how the current statement was reached. In a quantum program, while the simulated quantum state is represented in some set of variables, the representation is exponentially large in the number of qubits (2n complex numbers for n qubits) and not in a form that makes it easy for the developer to glean any useful information from the classical variable contents.

In embodiments of the disclosed technology, the developer is able to view and interact with the quantum state in a way that reflects what would be the actual information content of the quantum state but does not disturb the quantum state. In more detail, the interaction is not actually performed in the physical quantum device, so the quantum state is not modified. Instead, the interaction can be computed within a classical computer without disentangling or otherwise modifying an actual quantum state.

An example of this interaction is illustrated in example screen shot 600 of FIG. 6. In particular, the example screen shot 600 shows a graphic user interface that allows a developer to inspect various properties of the qubits currently being simulated (sometimes referred to as qubit objects). In particular, in screen shot 600, the graphic user interface shows a hierarchical display through which a developer can inspect the current state of qubits being simulated (e.g., using a suitable quantum computing simulator, such as the Q #simulator available from Microsoft® Corporation). In particular, the screen shot 600 shows, for example, a register object 610 for "register2" in the simulated quantum program being displayed; the register object 610 is expanded to show four qubit objects 612, 614, 616, 618; still further, each qubit object is further expanded to display further information regarding the respective qubit—in this example, an "ID" 620 of the qubit and a "probability" 622 of the qubit (representing the quantum state vector of the qubit) for an example representative qubit. In some examples, for instance, the probability 622 is the value that, if one were to measure the qubit, one would get "One" (as opposed to "Zero"). For ease of illustration, only one example ID and probability are shown in FIG. 6. In this example, the qubits are in the |0> state. (Note that, in this example, the ID of a qubit is assigned at runtime and it is not necessarily aligned with the order in which the qubit was allocated or its position within a qubit register.)

C. Allowing the Developer to Assert the Probability of a Specified Measurement Outcome on the Current State Embodiments of the disclosed technology include an "assert" statement or function that allows the developer to assert that some quantum-computing-specific statement is true, and that will cause the program to fail if the statement is false. This is very useful for testing. In the quantum context, an example assert statement (e.g., the "AssertProb" statement in Q #) asserts that the result of a given measurement, if it were to be performed, would be "Zero" with a developer-specified probability (quantum measurements result in "Zero" (false) or "One" (true) in, e.g., Q #).

The measurement is not actually performed in the physical quantum device, so the quantum state is not modified. Instead, the measurement probability can be computed within a classical computer without disentangling or otherwise modifying an actual quantum state. There is no analogue in other languages simply because it only makes sense in a quantum or other probabilistic setting. In this regard, and in certain examples, while one can directly perform a measurement that is guaranteed to return "Zero" if the state is correct in a real physical quantum device, one cannot create a measurement in a real physical quantum device that is guaranteed to return "One" if the state is wrong. In more detail, with a real quantum computer, one prepares the state over and over, and measures over and over, to gain confidence that one is in the correct state, but one can never know with certainty. With a simulator, by contrast, one can be completely certain.

Examples of a probability assertion statement are described in the paragraphs below.

In a first example, the statement is termed "AssertProb", but this is by way of example only. To help explain the probability assertion statement, suppose that "P: Qubit=>Unit" is an operation intended to prepare the state $|\psi\rangle$ when its input is in the state $|0\rangle$. Let $|\psi'\rangle$ be the actual state prepared by "P". Then, $|\psi\rangle=|\psi'\rangle$ if and only if measuring $|\psi'\rangle$ in the axis described by Iv) always returns "Zero". That is: $|\psi\rangle=|\psi'\rangle$ if and only if $\langle\psi|\psi'\rangle=1$.

Using known primitive operations (including, for example, those described at https://docs.microsoft.com/en-us/quantum), one can directly perform a measurement that returns "Zero" if $|\psi\rangle$ is an eigenstate of one of the Pauli operators.

In the case that the target machine is a simulator, however, various unique advantages can be realized in accordance with embodiments of the disclosed technology. For example, one can use the classical information used by a simulator to represent the internal state of a qubit that is amenable to copying, such that one does not need to actually perform a measurement to test the assertion. In particular, this allows one to reason about incompatible measurements that would be impossible on actual hardware (e.g., because of the disentangling or other modification of the actual quantum state that would otherwise occur).

Figure 7:
FIG. 7 shows example code that uses an example assertion for determining a probability of a particular qubit.

FIG. 7 shows example unit test code 700 that uses the example "AssertProb" operation at 710. In one example, the "AssertProb" operation asserts that measuring the given qubits in the given Pauli basis will have the given result with the given probability, within some tolerance.

Figure 8:
FIG. 8 shows an example definition of code for an example assertion for determining a probability of a particular qubit.

A definition of the example "AssertProb" operation is illustrated by the example code 800 in FIG. 8. In this example, the input is the Pauli basis ("bases") which is a measurement effect to assert the probability of, expressed as a multi-qubit Pauli operator, the identification of a qubit ("qubits") on which to make the assertion, an expected result of a measurement operation on the qubit ("result"), the probability ("prob") with which the given result is expected, a message ("msg") to be reported if the assertion fails, and/or a tolerance value ("tol"). In this example, the assertion (or assert operation) either continues if no error is found, or aborts the computation with an error message if an error is found.

Figure 9:
FIG. 9 shows example code that includes an assertion that checks the expected state of a particular qubit.

In a further example operation, "AssertQubit" (which again is by way of example only) is used to test the assertion $|\psi\rangle=|0\rangle$. This is common, for instance, when one has uncomputed to return ancilla qubits to $|0\rangle$ before releasing them. Asserting against $|0\rangle$ is also useful when, by way of example and as illustrated by the example code 900 shown in FIG. 9, one wishes to assert that two state preparation operations (here, for example, "P" and "Q" operations) both prepare the same state, and when "Q" supports an "Adjoint" operation (where the "Adjoint" operation is complex conjugate transpose of the operation, and where, for operations that implement a unitary operator, the adjoint is the inverse of the operation.)

Figure 10:
FIG. 10 shows an example definition of code that checks the expected state of a particular qubit.

In one example, the "AssertQubit" operation asserts that the qubit "Q" is in the expected eigenstate of the Pauli Z operator. The example operation has as input the expected result ("expected") (e.g., which state the qubit is expected to be in: "Zero" or "One") and the identification "Q" of the qubit (e.g., the qubit whose state is asserted). In this example, the assertion (or assert operation) either continues if no error is found, or aborts the computation with an error message if an error is found. A definition of the example "AssertQubit" operation is illustrated by the example code 1000 in FIG. 10.

A similar operation can allow for asserting arbitrary qubit states rather than only Z eigenstates. In one example, the operation is termed the "AssertQubitState" operation, which is by way of example only. More generally, one may not have access to assertions about states that do not coincide with eigenstates of Pauli operators. For example, $$|\psi\rangle = (|0\rangle + e^{i\pi/8}|1\rangle)/\sqrt{2}|$$

is not an eigenstate of any Pauli operator, such that one cannot use the AssertProb operation (or other equivalent operation) to uniquely determine that a state $|\psi'\rangle$ is equal to $|\psi\rangle$. Instead, one must decompose the assertion $|\psi'\rangle=|\psi\rangle$ into assumptions that can be directly tested using the primitives supported by a simulator.

To do so, let $|\psi\rangle=\alpha|0\rangle+\beta|1\rangle$ for complex numbers $$\alpha=a_r+a_i i \text{ and } \beta.$$

In this expression, $\beta=b_r+b_i i$. Note that this expression requires four real numbers $a_r$, $a_i$, $b_r$, $b_i$ to specify, as each complex number can be expressed as the sum of a real and imaginary part. Due to the global phase, however, one can choose $a_i=0$, such that one only needs three real numbers to uniquely specify a single-qubit state. Thus, three assertions can be specified which are independent of each other in order to assert the state that is expected. One can do so by finding the probability of observing "Zero" for each Pauli measurement given $\alpha$ and $\beta$, and asserting each independently. Let x, y, and z be "Result" values for Pauli X, Y, and Z measurements respectively. Then, using the likelihood function for quantum measurements, $$Pr(x = \text{Zero}|\alpha, \beta) = \frac{1}{2} + a_r b_r + a_i b_i$$

$$Pr(y = \text{Zero}|\alpha, \beta) = \frac{1}{2} + a_r b_i - a_i b_r$$

$$Pr(z = \text{Zero}|\alpha, \beta) = \frac{1}{2}(1 + a_r^2 + a_i^2 + b_r^2 + b_i^2).$$

The example assertion (e.g., "AssertQubitState") implements these assertions given representations of $\alpha$ and $\beta$ as values of a complex type. This is helpful when the expected state can be computed mathematically.

In one example, the "AssertQubitState" operation asserts that a qubit in the expected state ("expected") represents a complex vector, $|\psi\rangle =[a\ b]^T$. The first element of the tuples representing each of a, b is the real part of the complex number, while the second one is the imaginary part. In certain examples, an argument also defines the tolerance with which assertion is made.

In one example, the input is the expected complex amplitudes for $|0\rangle$ and $|1\rangle$, respectively, the identification of the qubit ("register") whose state is to be asserted (note that this qubit is assumed to be separable from other allocated qubits, and not entangled), and an additive tolerance value ("tolerance") by which amplitudes are allowed to deviate from the "expected" value. A definition of this example "AssertQubit" operation is illustrated by the example code 1000 in FIG. 10.

D. Allowing the Developer to View the Detailed Quantum State, Projected Down to a Small Number of Qubits, by Taking a Partial Trace Over the Other Qubits In certain embodiments, the disclosed debugging technology includes an operation/function to have the simulation system derive the implied quantum state on a subset of the qubits and display that derived state. This is useful for debugging because it allows the developer to focus on a critical subsystem. As above, the measurement is not actually performed in the physical quantum device, so the quantum state is not modified. Instead, the measurement can be computed within a classical computer without disentangling or otherwise modifying an actual quantum state.

In one example, the function is termed "DumpRegister". In this example, the DumpRegister function dumps the current target machine's status associated with the given qubits. The input of this example function comprises a "location" field, which provides information on where to generate the state's dump; and/or a "qubits" field (e.g., "Qubit[ ]") that provides a list of qubits to report.

This function allows one to output (dump) the information associated with the state of the given qubits into a file or some other location. The actual information generated and the semantics of the "location" field are specific to each target machine. However, in some examples, providing an empty location ("( )") typically means to generate the output to the console. This method expects a string with the path to a file in which it will write the state of the given qubits (e.g., the wavefunction of the corresponding subsystem) as a one-dimensional array of complex numbers, in which each element represents the amplitude of the probability of measuring the corresponding state. If the given qubits are entangled with some other qubit and their state cannot be separated, the example function just reports that the qubits are entangled.

E. Allowing the Developer to Assert that Two Qubits or Two Sets of Qubits are or are not Entangled A further example assertion/function, similar to the "AssertProb" introduced above, is one that allows the developer to assert that two qubits are or are not entangled. The check is not actually performed in the physical quantum device, so the quantum state is not modified. Instead, the check can be computed within a classical computer without disentangling or otherwise modifying an actual quantum state.

F. Allowing the Developer to View the Degree of Entanglement Between Two Qubits or Two Sets of Qubits This further example operation/function is another way of interacting with the quantum state. This example operation/function feature is related to the prior feature, but allows the developer to query for entanglement while debugging rather than assert that entanglement should or should not exist. The check is not actually performed in the physical quantum device, so the quantum state is not modified. Instead, the check can be computed within a classical computer without disentangling or otherwise modifying an actual quantum state.

G. Allowing the Developer to Save the Current State as a Reference State

This further example operation/function is another way of interacting with the quantum state. There are several reasons the developer might want to save the current quantum state for later retrieval; some of them are covered in later items, and others include running custom off-line state analysis routines on a saved quantum state. Again, the operation is not actually performed in the physical quantum device, so the quantum state is not modified. Instead, the operation can be computed within a classical computer without disentangling or otherwise modifying an actual quantum state.

H. Allowing the Developer to Determine Whether the Current State is Logically Equivalent to a Reference State.

This further example operation/function is another way of interacting with the quantum state. In many situations, it is desirable to determine if the code being developed is successfully getting to an expected, known state. For instance, if one is trying to optimize an algorithm, one might prepare and save a reference state using a known working program, and then run the optimized version and verify that the state that is produced is equivalent. It can be helpful to do this at multiple steps through a long algorithm, for instance to determine where a calculation is going wrong.

Note that for quantum states, this can be complicated because the simulated representation of a quantum state is in general not unique, and so the system needs to check for logical equivalence rather than just checking that the numbers in the representations are identical. This check is not actually performed in the physical quantum device, so the quantum state is not modified. Instead, the check can be computed within a classical computer without disentangling or otherwise modifying an actual quantum state.

I. Allowing the Developer to Determine What the Difference is Between the Current State and a Reference State This further example operation/function is another way of interacting with the quantum state. In particular, this operation/function can perform one of a number of difference operations that can be helpful in determining the difference between two states. For instance, the difference computed can be the distance between two states, using any number of interesting distance measurements (e.g., L2 distance, fidelity, overlap, and other such distance measurements), or the difference can be the simplest sequence of simple operations that would transform one state into the other. As above, the measurement is not actually performed in the physical quantum device, so the quantum state is not modified. Instead, the measurement can be computed within a classical computer without disentangling or otherwise modifying an actual quantum state.

J. Allowing the Developer to Apply a Simple Operation to the Current State and View the Result This further example operation/function is another way of interacting with the quantum state. It is useful sometimes to be able to say "what would the state be if I added this gate to the algorithm here?", without actually changing the algorithm. This functionality provides that capability. Further, the operation is not actually performed in the physical quantum device, so the quantum state is not modified.

Instead, the operation can be computed within a classical computer without disentangling or otherwise modifying an actual quantum state.

K. Allowing the Developer to Apply a Simple Operation to the Current State and Continue the Algorithm with the Modified State This further example operation/function is another way of interacting with the quantum state. This is similar to the previous item, but after making the change, allowing the algorithm to continue. Further, the operation is not actually performed in the physical quantum device, so the quantum state is not modified. Instead, the operation can be computed within a classical computer without disentangling or otherwise modifying an actual quantum state.

IV. EXAMPLE GENERAL EMBODIMENTS

Figure 11:
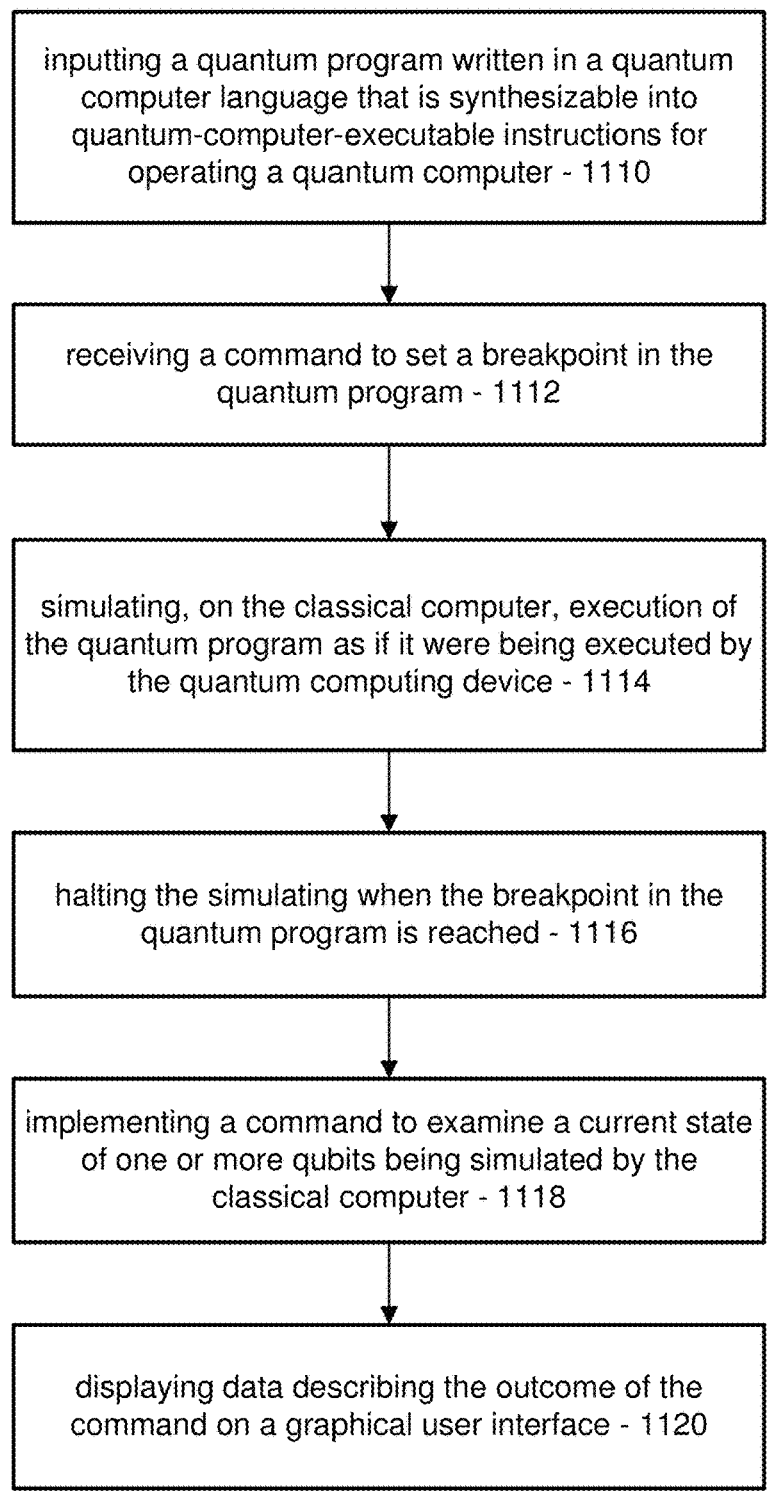
FIG. 11 is a flowchart showing an example embodiment of the disclosed technology.

FIG. 11 is a flow chart showing an example method 1100 for performing debugging of a quantum program using embodiments of the disclosed technology. The particular embodiment should not be construed as limiting, as the disclosed method acts can be performed alone, in different orders, or at least partially simultaneously with one another. Further, any of the disclosed methods or method acts can be performed with any other methods or method acts disclosed herein.

At 1110, a quantum program written in a quantum computer language that is synthesizable into quantum-computer-executable instructions for operating a quantum computer is input (e.g., buffered into memory, loaded, or otherwise prepare for further processing).

At 1112, a command is received to set a breakpoint in the quantum program.

At 1114, execution of the quantum program is simulated, on the classical computer, as if it were being executed by the quantum computing device.

At 1116, the simulating is halted when the breakpoint in the quantum program is reached.

At 1118, a command to examine a current state of one or more qubits being simulated by the classical computer is implemented.

At 1120, data describing the outcome of the command is displayed on a graphical user interface.

In some implementations, the method further comprises receiving a modification to the quantum program resulting in a modified quantum program; and outputting the modified quantum program. In further implementations, the method further comprises synthesizing the modified quantum program into the quantum-computer-executable instructions for operating the quantum computer; and configuring the quantum computer to execute the quantum-computer-executable instructions for the modified quantum program.

In certain implementations, the command to examine the current state comprises an assertion to assert that two qubits are or are not entangled. In other implementations, the command to examine the current state comprises an assertion to assert a degree to which two qubits are or are not entangled.

In further implementations, the method also comprises receiving a command to set the current state as a reference state. In such implementations, the method can further comprise receiving a modification to the quantum program resulting in a modified quantum program; simulating, on the classical computer, execution of the modified quantum program as if it were being executed by the quantum computing device; halting the simulating when the breakpoint in the modified quantum program is reached at the breakpoint of the modified quantum program; and determining whether a current state of the one or more qubits resulting from the modified quantum program being simulated by the classical computer.

In some embodiments, the method further comprises simulating addition or subtraction of one or more quantum computer hardware elements; and updating a current state of the one or more qubits in view of the added or subtracted one or more quantum computer hardware elements.

Figure 12:
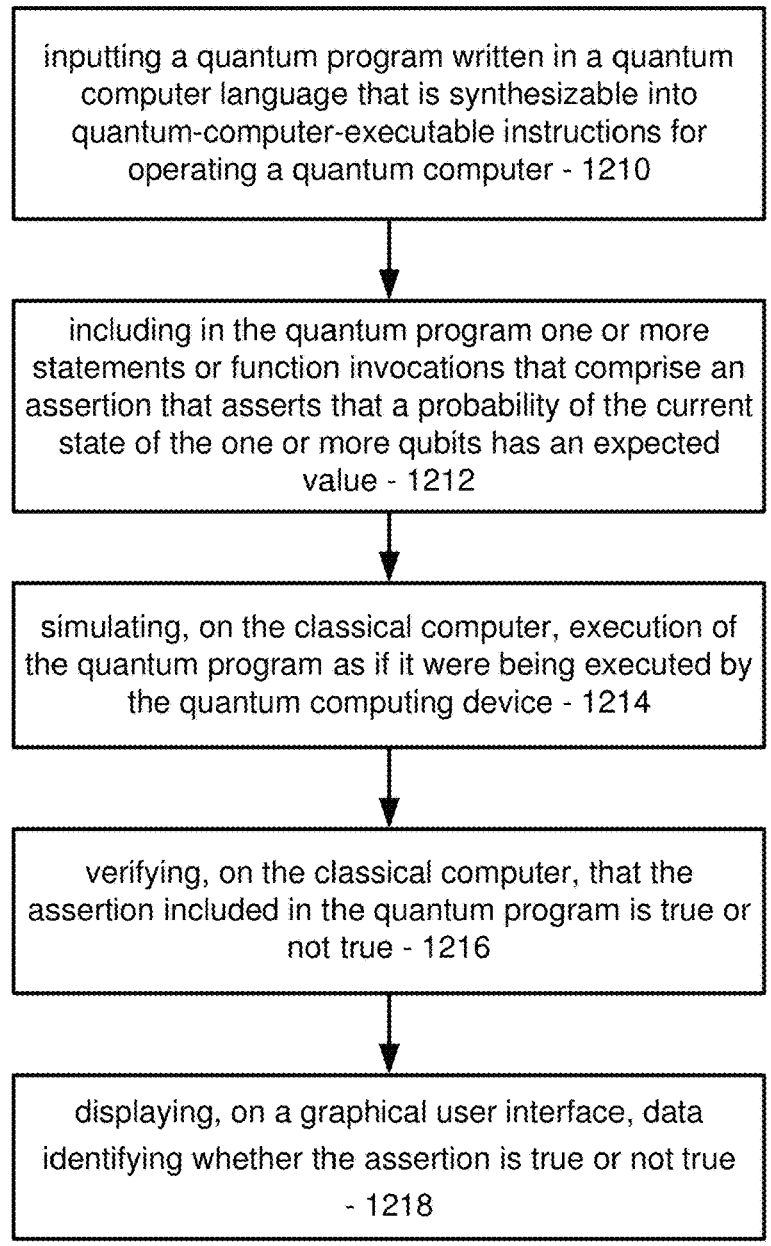
FIG. 12 is a flowchart showing another example embodiment of the disclosed technology.

FIG. 12 is a flow chart showing an example method 1200 for performing debugging of a quantum program using embodiments of the disclosed technology. The particular embodiment should not be construed as limiting, as the disclosed method acts can be performed alone, in different orders, or at least partially simultaneously with one another. Further, any of the disclosed methods or method acts can be performed with any other methods or method acts disclosed herein.

At 1210, a quantum program written in a quantum computer language that is synthesizable into quantum-computer-executable instructions for operating a quantum computer is input (e.g., buffered into memory, loaded, or otherwise prepared for further processing).

At 1212, one or more statements or function invocations are included in the quantum program, where the one or more statement or function invocations comprise an assertion that asserts that a probability of the current state of the one or more qubits has an expected value.

At 1214, execution of the quantum program is simulated, on the classical computer, as if it were being executed by the quantum computing device.

At 1216, the assertion included in the quantum program is verified, on the classical computer, as being either true or not true.

At 1218, data identifying whether the assertion is true or not true is displayed on a graphical user interface.

In certain implementations, the assertion asserts that a selected qubit is in the expected eigenstate of the Pauli Z operator. In other implementations, the assertion asserts that a selected qubit in an expected state represents a complex vector, $|\psi\rangle = [a\ b]^T$.

In some implementations, the method further comprises: receiving a modification to the quantum program resulting in a modified quantum program; and outputting the modified quantum program. In such implementations, the method can further comprise synthesizing the modified quantum program into the quantum-computer-executable instructions for operating the quantum computer.

In further implementations, the method further comprises receiving a command to set a breakpoint in the quantum program; and halting the simulating when the breakpoint in the quantum program is reached.

Figure 13:
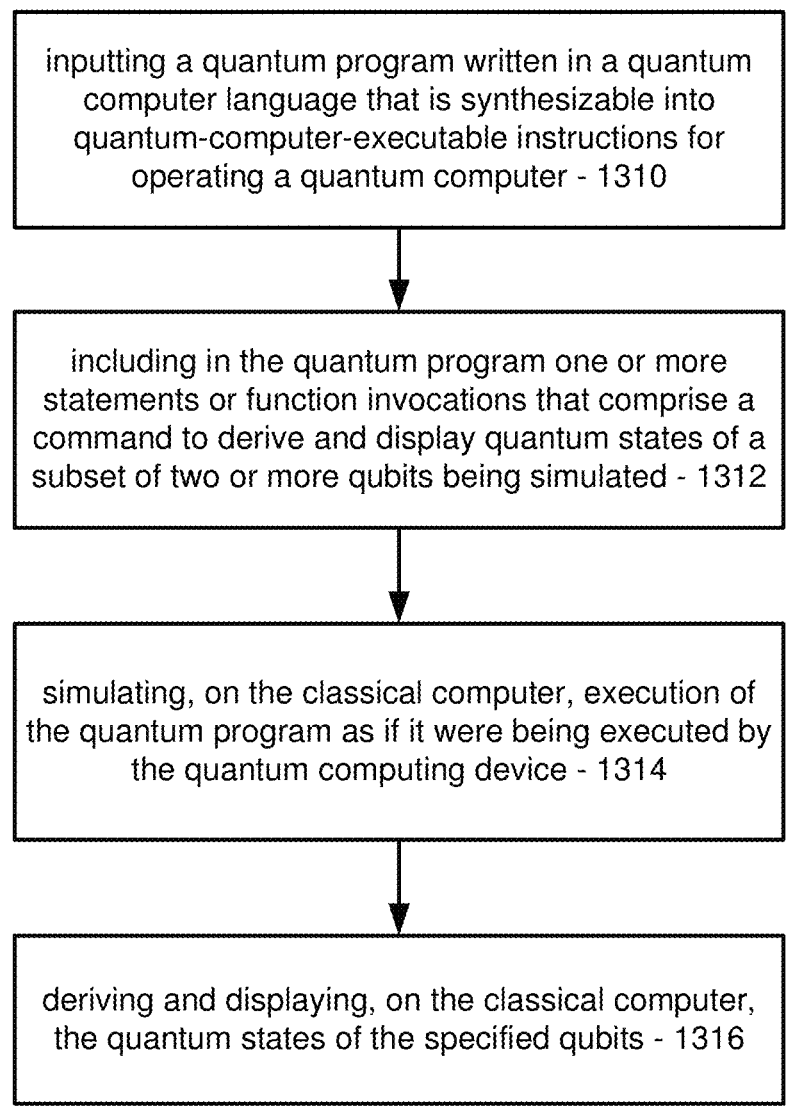
FIG. 13 is a flowchart showing a further example embodiment of the disclosed technology.

FIG. 13 is a flow chart showing an example method 1300 for performing debugging of a quantum program using embodiments of the disclosed technology. The particular embodiment should not be construed as limiting, as the disclosed method acts can be performed alone, in different orders, or at least partially simultaneously with one another. Further, any of the disclosed methods or method acts can be performed with any other methods or method acts disclosed herein.

At 1310, a quantum program written in a quantum computer language that is synthesizable into quantum-computer-executable instructions for operating a quantum computer is input (e.g., buffered into memory, loaded, or otherwise prepare for further processing).

At 1312, one or more statements or function invocations are included in the quantum program, where the one or more statements or function invocations comprise a command to derive and display quantum states of a subset of two or more qubits being simulated.

At 1314, execution of the quantum program is simulated, on the classical computer, as if it were being executed by the quantum computing device.

At 1316, the quantum states of the specified qubits are derived and displayed on the classical computer, In certain implementations, the method further comprises receiving a command to set a breakpoint in the quantum program, and halting the simulating when the breakpoint in the quantum program is reached. In some implementations, the method further comprises receiving a modification to the quantum program resulting in a modified quantum program, and outputting the modified quantum program. In such implementations, the method further comprises synthesizing the modified quantum program into the quantum-computer-executable instructions for operating the quantum computing device. In certain implementations, the method further comprises implementing a command to examine a current state of one or more qubits being simulated by the classical computer. In such implementations, the command to examine the current state comprises: (a) an assertion that asserts that a probability of the current state of the one or more qubits has an expected value; (b) an assertion that asserts that a selected qubit is in the expected eigenstate of the Pauli Z operator; and/or (c) an assertion that asserts that a selected qubit in an expected state represents a complex vector, $|\psi\rangle = [a\ b]^T$.

Any of the above disclosed methods can be implemented as computer-readable media storing computer-executable instructions which when executed by a classical computer processor cause the classical computer processor to perform any of the disclosed methods. Further, any of the above disclosed methods can be implemented as part of a quantum computing system. For example, any of the above disclosed methods can be implemented by a system comprising a quantum computing device, and a classical computing device in communication with the quantum computing device and configured to perform any of the disclosed methods.

V. Example Computing Environments

FIG. 1 illustrates a generalized example of a suitable classical computing environment 100 in which several of the described embodiments can be implemented. The computing environment 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing environment 100 includes at least one processing device 110 and memory 120. In FIG. 1, this most basic configuration 130 is included within a dashed line. The processing device 110 (e.g., a CPU or microprocessor) executes computer-executable instructions. In a multi-processing system, multiple processing devices execute computer-executable instructions to increase processing power. The memory 120 may be volatile memory (e.g., registers, cache, RAM, DRAM, SRAM), non-volatile memory (e.g., ROM, EEPROM, flash memory), or some combination of the two. The memory 120 stores software 180 implementing tools for performing any of the debugging or simulation techniques as described herein. The memory 120 can also store software 180 for debugging and simulating quantum programs as described herein, as well as software 180 for synthesizing, generating, or compiling quantum circuits resulting from the tested quantum programs.

The computing environment can have additional features. For example, the computing environment 100 includes storage 140, one or more input devices 150, one or more output devices 160, and one or more communication connections 170. An interconnection mechanism (not shown), such as a bus, controller, or network, interconnects the components of the computing environment 100. Typically, operating system software (not shown) provides an operating environment for other software executing in the computing environment 100, and coordinates activities of the components of the computing environment 100.

The storage 140 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 100. The storage 140 can also store instructions for the software 180 implementing any of the disclosed debugging and/or simulation techniques. The storage 140 can also store instructions for the software 180 for generating and/or synthesizing any of the described techniques, systems, or reversible circuits.

The input device(s) 150 can be a touch input device such as a keyboard, touchscreen, mouse, pen, trackball, a voice input device, a scanning device, or another device that provides input to the computing environment 100. The output device(s) 160 can be a display device (e.g., a computer monitor, laptop display, smartphone display, tablet display, netbook display, or touchscreen), printer, speaker, or another device that provides output from the computing environment 100.

The communication connection(s) 170 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods, debugging techniques, circuit design techniques, or compilation/synthesis techniques can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 120 and/or storage 140, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 2:
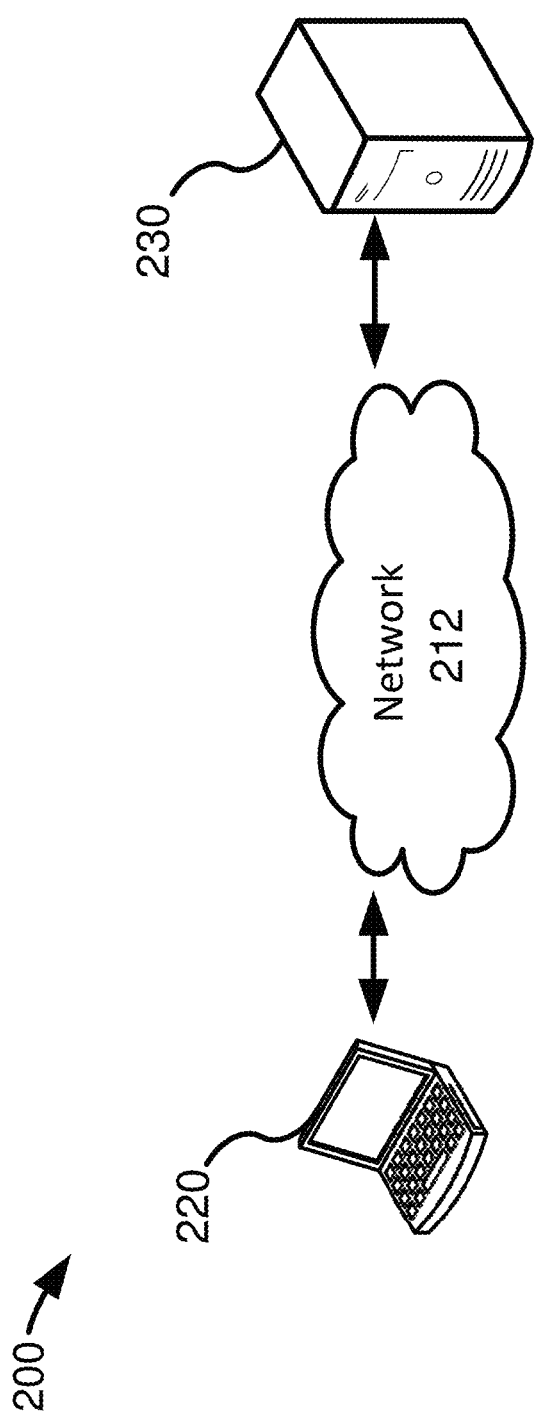
FIG. 2 illustrates an example of a possible network topology (e.g., a client-server network) for implementing a system according to the disclosed technology.

An example of a possible network topology 200 (e.g., a client-server network) for implementing a system according to the disclosed technology is depicted in FIG. 2. Networked computing device 220 can be, for example, a computer running a browser or other software connected to a network 212. The computing device 220 can have a computer architecture as shown in FIG. 2 and discussed above. The computing device 220 is not limited to a traditional personal computer but can comprise other computing hardware configured to connect to and communicate with a network 212 (e.g., smart phones, laptop computers, tablet computers, or other mobile computing devices, servers, network devices, dedicated devices, and the like). In the illustrated embodiment, the computing device 220 is configured to communicate with a computing device 230 (e.g., a remote server, such as a server in a cloud computing environment, which can comprise one or more classical processing units, FPGAs, GPUs, or other such processing devices) via a network 212. In the illustrated embodiment, the computing device 220 is configured to transmit input data to the computing device 230, and the computing device 230 is configured to implement a quantum program debugging/simulation technique according to any of the disclosed embodiments and/or a circuit generation or compilation/synthesis methods for generating quantum circuits based on or in conjunction with any of the quantum program debugging/simulation techniques disclosed herein. The computing device 230 can output results to the computing device 220. Any of the data received from the computing device 230 can be stored or displayed on the computing device 220 (e.g., displayed as data on a graphical user interface or web page at the computing devices 220). In the illustrated embodiment, the illustrated network 212 can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 212 can be the Internet or a similar public network and operate using an appropriate protocol (e.g., the HTTP protocol).

Figure 3:
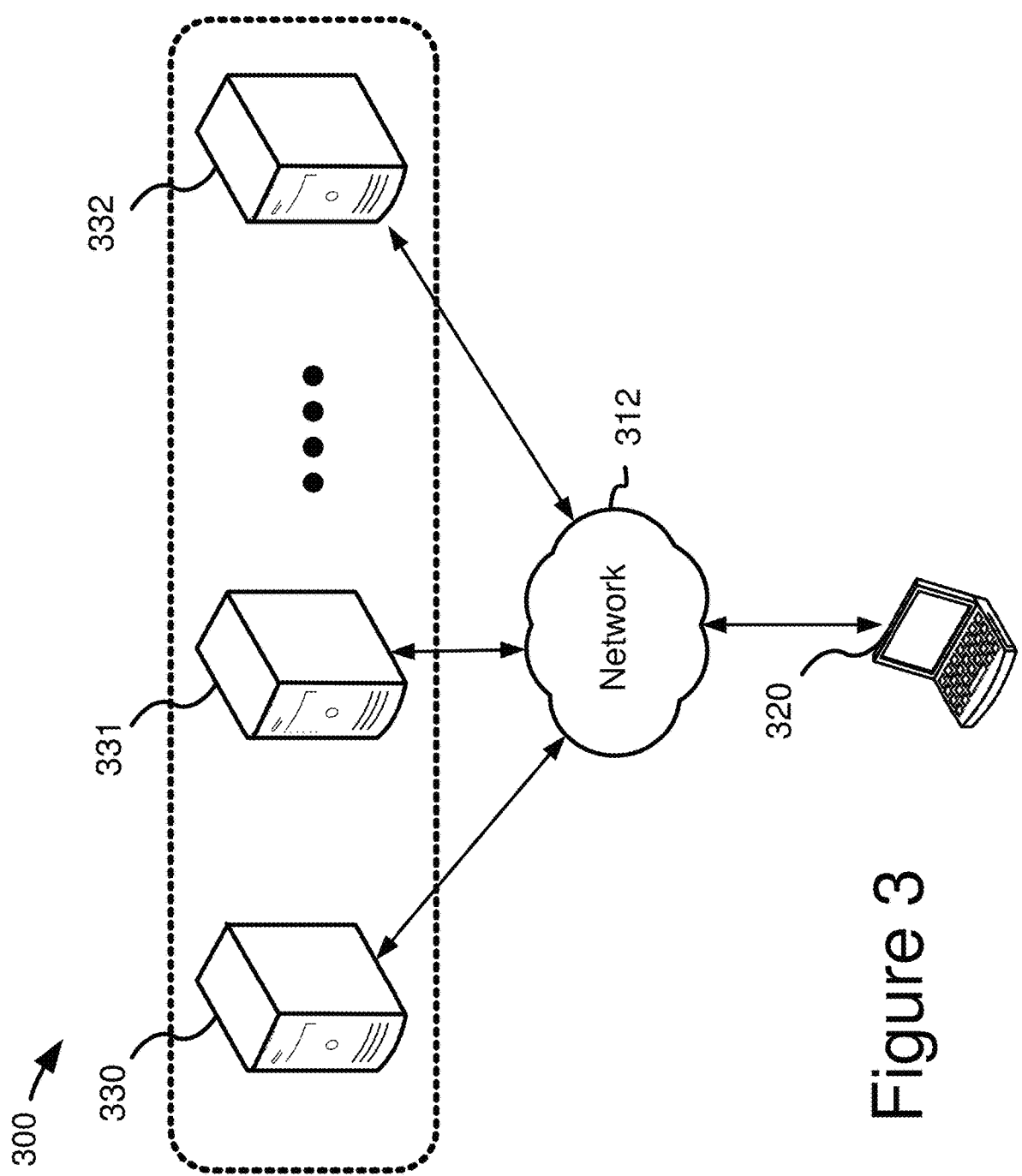
FIG. 3 illustrates another example of a possible network topology (e.g., a distributed computing environment) for implementing a system according to the disclosed technology.

Another example of a possible network topology 300 (e.g., a distributed computing environment) for implementing a system according to the disclosed technology is depicted in FIG. 3. Networked computing device 320 can be, for example, a computer running a browser or other software connected to a network 312. The computing device 320 can have a computer architecture as shown in FIG. 1 and discussed above. In the illustrated embodiment, the computing device 320 is configured to communicate with multiple computing devices 330, 331, 332 (e.g., remote servers or other distributed computing devices, such as one or more servers in a cloud computing environment, which can comprise one or more classical processing units, FPGAs, GPUs, or other such processing devices) via the network 312. In the illustrated embodiment, each of the computing devices 330, 331, 332 in the computing environment 300 is used to perform at least a portion of a quantum program debugging and/or simulation technique (as disclosed herein) and/or a synthesis/compilation process. In other words, the computing devices 330, 331, 332 form a distributed computing environment in which the quantum program debugging and/or simulation technique (as disclosed herein) and/or generation/compilation/synthesis processes are shared across multiple computing devices. The computing device 320 is configured to transmit input data to the computing devices 330, 331, 332, which are configured to distributively implement such as process, including performance of any of the disclosed debugging/simulation methods, and to provide results to the computing device 320. Any of the data received from the computing devices 330, 331, 332 can be stored or displayed on the computing device 320 (e.g., displayed as data on a graphical user interface or web page at the computing devices 320). The illustrated network 312 can be any of the networks discussed above with respect to FIG. 2.

Figure 4:
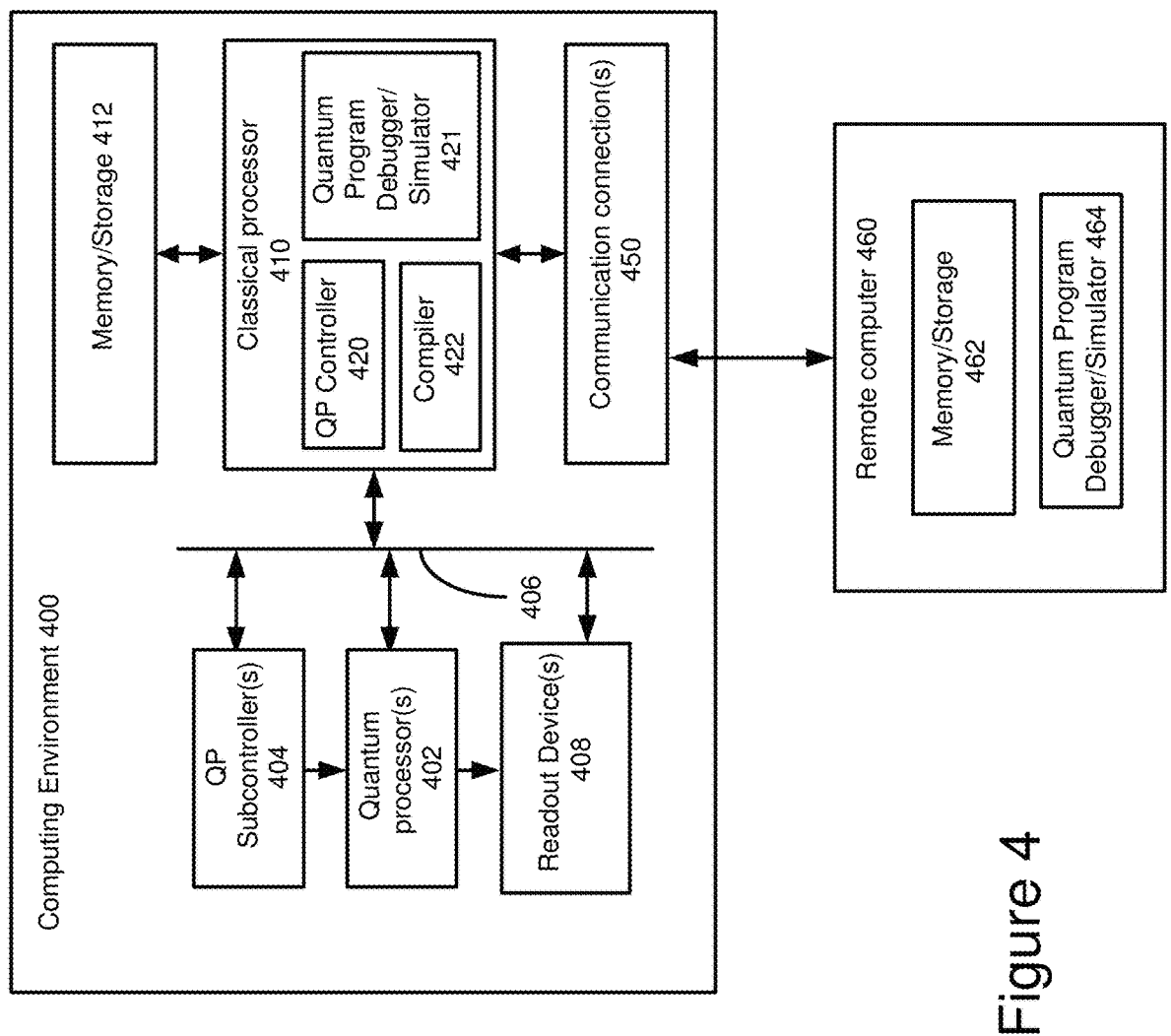
FIG. 4 illustrates an exemplary system for implementing the disclosed technology.

With reference to FIG. 4, an exemplary system for implementing the disclosed technology includes computing environment 400. In computing environment 400, a compiled quantum computer circuit description (including quantum circuits resulting from and/or supported by any of the quantum program debugging/simulation techniques as disclosed herein) can be used to program (or configure) one or more quantum processing units such that the quantum processing unit(s) implement the circuit described by the quantum computer circuit description.

The environment 400 includes one or more quantum processing units 402 and one or more readout device(s) 408. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer; (c) a fault-tolerant architecture for quantum computing; and/or (d) a topological quantum architecture (e.g., a topological quantum computing device using Majorana zero modes). The precompiled quantum circuits, including any of the disclosed circuits, can be sent into (or otherwise applied to) the quantum processing unit(s) via control lines 406 at the control of quantum processor controller 420. The quantum processor controller (QP controller) 420 can operate in conjunction with a classical processor 410 (e.g., having an architecture as described above with respect to FIG. 1) to implement the desired quantum computing process. In the illustrated example, the QP controller 420 further implements the desired quantum computing process via one or more QP subcontrollers 404 that are specially adapted to control a corresponding one of the quantum processor(s) 402. For instance, in one example, the quantum controller 420 facilitates implementation of the compiled quantum circuit by sending instructions to one or more memories (e.g., lower-temperature memories), which then pass the instructions to low-temperature control unit(s) (e.g., QP subcontroller(s) 404) that transmit, for instance, pulse sequences representing the gates to the quantum processing unit(s) 402 for implementation. In other examples, the QP controller(s) 420 and QP subcontroller(s) 404 operate to provide appropriate magnetic fields, encoded operations, or other such control signals to the quantum processor(s) to implement the operations of the compiled quantum computer circuit description. The quantum controller(s) can further interact with readout devices 408 to help control and implement the desired quantum computing process (e.g., by reading or measuring out data results from the quantum processing units once available, etc.)

With reference to FIG. 4, compilation is the process of translating a high-level description of a quantum algorithm into a quantum computer circuit description comprising a sequence of quantum operations or gates, which can include the circuits as disclosed herein. The compilation can be performed by a compiler 422 using a classical processor 410 (e.g., as shown in FIG. 1) of the environment 400 which loads the high-level description from memory or storage devices 412 and stores the resulting quantum computer circuit description in the memory or storage devices 412. Additionally, a debugger/simulator 421 can be used to develop a quantum program and evaluate the quantum program using any of the disclosed debugging techniques.

In other embodiments, compilation and/or quantum program debugging can be performed remotely by a remote computer 460 (e.g., a computer having a computing environment as described above with respect to FIG. 1) which stores the resulting quantum computer circuit description in one or more memory or storage devices 462 and transmits the quantum computer circuit description to the computing environment 400 for implementation in the quantum processing unit(s) 402. For instance, with reference to FIG. 4, remote computer 460 includes a quantum program debugger/simulator 464 that can be perform any of the debugging and/or simulation techniques disclosed herein. Still further, the remote computer 400 can store the high-level description in the memory or storage devices 462 and transmit the high-level description to the computing environment 400 for compilation and use with the quantum processor(s).

In any of these scenarios, results from the computation performed by the quantum processor(s) can be communicated to the remote computer after and/or during the computation process. Still further, the remote computer can communicate with the QP controller(s) 420 such that the quantum computing process (including any debugging, simulation, compilation, and QP control procedures) can be remotely controlled by the remote computer 460. In general, the remote computer 460 communicates with the QP controller(s) 420, compiler/synthesizer 422, quantum program debugger/simulator 421, via communication connections 450.

In particular embodiments, the environment 400 can be a cloud computing environment, which provides the quantum processing resources of the environment 400 to one or more remote computers (such as remote computer 460) over a suitable network (which can include the internet).

VI. Concluding Remarks

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

What is claimed is:

1. One or more computer-readable media storing computer-executable instructions which when executed by a classical computer processor cause the classical computer processor to perform a method, the method comprising:
   inputting a quantum program written in a quantum computer language that is synthesizable into quantum-computer-executable instructions for operating a sequence of gates defining quantum operations in a quantum computer;
   including in the quantum program a command to examine a current state of one or more qubits being simulated by the classical computer, wherein the command to examine the current state comprises: (a) an assertion that asserts that a probability of the current state of the one or more qubits has an expected value; (b) an assertion that a selected qubit is in the expected eigenstate of the Pauli Z operator; or (c) an assertion that asserts that a selected qubit in an expected state represents a complex vector, $|\psi\rangle = [a\ b]^T$;
   simulating, on the classical computer, execution of the quantum program as if it were being executed by the sequence of gates of the quantum computing device;
   verifying, on the classical computer, whether the assertion included in the quantum program and associated with the command is true or not true; and
   displaying, on a graphical user interface, data identifying whether the assertion is true or not true.

2. The one or more computer-readable media of claim 1, wherein the assertion asserts that a selected qubit is in the expected eigenstate of the Pauli Z operator.

3. The one or more computer-readable media of claim 1, wherein the assertion asserts that a selected qubit in an expected state represents a complex vector, $|\psi\rangle = [a\ b]^T$.

4. The one or more computer-readable media of claim 1, wherein the method further comprises:
   receiving a modification to the quantum program resulting in a modified quantum program; and
   outputting the modified quantum program.

5. The one or more computer-readable media of claim 4, wherein the method further comprises synthesizing the modified quantum program into the quantum-computer-executable instructions for operating the quantum computer.

6. The one or more computer-readable media of claim 1, wherein the method further comprises:
   receiving a command to set a breakpoint in the quantum program; and
   halting the simulating when the breakpoint in the quantum program is reached.

7. A system, comprising:
   a quantum computing device; and
   a classical computing device in communication with the quantum computing device and configured to perform a method, the method comprising:
   inputting a quantum program written in a quantum computer language that is synthesizable into quantum-computer-executable instructions for operating a sequence of gates defining quantum operations in a quantum computer;
   including in the quantum program one or more statements or function invocations that comprise a command to derive and display quantum states of a subset of two or more qubits being simulated;
   simulating, on the classical computer, execution of the quantum program as if it were being executed by the quantum computing device;
   deriving and displaying, on the classical computer, the quantum states of the specified qubits; and
   implementing a command to examine a current state of one or more qubits being simulated by the classical computer, wherein the command to examine the current state comprises: (a) an assertion that asserts that a probability of the current state of the one or more qubits has an expected value; (b) an assertion that a selected qubit is in the expected eigenstate of the Pauli Z operator; or (c) an assertion that asserts that a selected qubit in an expected state represents a complex vector, $|\psi\rangle = [a\ b]^T$.

8. The system of claim 7, wherein the method further comprises:
receiving a command to set a breakpoint in the quantum program;
halting the simulating when the breakpoint in the quantum program is reached.

9. The system of claim 7, wherein the method further comprising:
receiving a modification to the quantum program resulting in a modified quantum program; and
outputting the modified quantum program.

10. The system of claim 9, wherein the method further comprises:
synthesizing the modified quantum program into the quantum-computer-executable instructions for operating the quantum computing device.

11. The one or more computer-readable media of claim 1, wherein the command to examine the current state comprises the assertion that the probability of the current state of the one or more qubits has the expected value, wherein the assertion asserts that two qubits are or are not entangled.

\* \* \* \* \*